United States Patent Office 3,657,326
Patented Apr. 18, 1972

3,657,326
PRODUCTION OF ALKENYL ALKANOATES
Paul R. Stapp, Bartlesville, Okla., assignor to
Phillips Petroleum Company
No Drawing. Filed Dec. 11, 1969, Ser. No. 884,352
Int. Cl. C07c 67/00
U.S. Cl. 260—491
10 Claims

ABSTRACT OF THE DISCLOSURE

Alkenyl alkanoates are produced by reacting 1-alkenes and methylene dialkanoates in the presence of a Lewis acid catalyst.

---

This invention relates to a process for the production of alkenyl alkanoates.

The alkanoates that can be produced according to the process of this invention are known in the art. For example, 3-butenyl acetate is disclosed in the Journal of Polymer Science, volume 4, pages 2617–2636 (1966) at page 2635.

It now has been found that these alkanoates can be produced by reacting 1-alkenes and methylene dialkanoates in the presence of a Lewis acid catalyst.

Accordingly, it is an object of this invention to provide a process for the production of alkenyl alkanoates.

Other objects, aspects and advantages of this invention will become apparent to one skilled in the art upon consideration of the following disclosure and appended claims.

The conversion of this invention can be represented as follows:

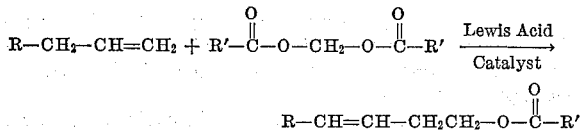

wherein R is hydrogen or alkyl, cycloalkyl, alkylcycloalkyl, cycloalkylalkyl, or the like having from 1 to 10 carbon atoms per R radical and wherein R' is alkyl having from 1 to 6 carbon atoms per R' group.

Specific examples of 1-alkenes that can be employed in the process of this invention are 1-hexene, 1-tridecene, propene, 4,4-dimethyl-1-decene, 6-ethyl-1-octene, 3-cyclopentyl - 1-propene, 3-cyclodecyl-1-propene, 3-(2-methylcyclopentyl) - 1 - propene, 3-(2,5-dimethylcyclooctyl)-1-propene, 8 - cyclopentyl-1-octene, 5-cyclopentyl-1-octene, 1-pentene, 1-butene, 1-heptene, 1-decene, 1-dodecene, and the like, and mixtures thereof.

Specific examples of the methylene dialkanoates that can be employed in this invention are methylene diacetate, methylene diheptanoate, methylene dipropanoate, methylene di-(2-methylhexanoate), methylene di-(2,2-dimethylpentanoate), methylene dibutanoate, and the like, and mixtures thereof.

Specific examples of alkenyl alkanoates that are produced by the process of this invention are 3-heptenyl acetate,
3-butenyl acetate,
3-tetradecenyl heptanoate,
5,5-dimethyl-3-undecenyl 2-methylhexanoate,
7-ethyl-3-nonenyl 2,2-dimethylpentanoate,
4-cyclopentyl-3-butenyl butanoate,
4-cyclodecyl-3-butenyl hexanoate,
4-(2-methylcyclopentyl)-3-butenyl acetate,
4-(2,5-dimethylcyclooctyl)-3-butenyl acetate,
9-cyclopentyl-3-nonenyl propanoate,
6-cyclopentyl-3-nonenyl pentanoate,
3-tridecenyl acetate,
and the like, and mixtures thereof.

Generally, the reaction temperature ranges from 0 to 150° C., preferably from 50 to 100° C. Reaction times sufficient to carry out the desired degree of conversion are employed. Generally, the reaction time ranges from 10 minutes to 48 hours. Pressure sufficient to maintain the reactants substantially completely in the liquid phase are usually employed. Generally, this pressure ranges from 0.5 to 10 atmospheres. Atmospheric pressure is often employed because of convenience.

The mole ratio of 1-alkene to methylene dialkanoate generally ranges from 0.1:1 to 10:1, preferably from 0.5:1 to 5:1. The Lewis acid catalyst is employed in the range of 0.1 to 50 g. per 100 g. of reactants.

A suitable diluent, if desired, can comprise as much as 95 weight percent of the liquid reaction medium. Any diluent can be employed which is substantially completely non-reactive under the reaction environment. Examples of suitable diluents include carbon tetrachloride, chloroform, fluoroform, dichlorodifluoromethane, fluorotrichloromethane, methylene chloride, hexane, cyclohexane, pentane, and the like, and mixtures thereof.

Specific examples of Lewis acid catalysts which can be employed in the process of this invention are zinc dichloride, aluminum trichloride, stannic chloride, stannous chloride, arsenic trichloride, ferric chloride, boron, trifluoride, titanium tetrachloride, titanium tetrafluoride, bismuth trichloride, antimony trichloride, antimony pentachloride, boron phosphate, boron fluoride etherate, and the like, and mixtures thereof.

The alkenyl alkanoates which are produced according to the process of this invention can be hydrogenated to form straight-chain alkanoates which are useful as solvents. The resultant alkyl alkanoates can be saponified to form saturated alcohols. Further, the alkenyl alkanoates can be copolymerized with a thiocarbonylfluoride and then processed into a film that is both elastic and colorless, according to the process described on page 2635 of the previously cited Journal of Polymer Science.

The advantages of this invention are further illustrated by the following examples. The reactants and proportions and other specific conditions are presented as being typical and should not be construed to limit the invention unduly.

EXAMPLE I

A stirred reactor was charged with 66 g. of methylene diacetate, 56 g. of 1-hexene, 10 ml. of boron fluoride etherate, and 200 ml. of carbon tetrachloride. The reaction mixture was heated at reflux temperature for 24 hours. Analysis of the product by gas-liquid chromatography determined that a conversion of 27 mole percent of the methylene diacetate to 3-heptenyl acetate was effected.

This run clearly demonstrates that the desired alkanoates are produced in substantial amounts by the process of this invention.

EXAMPLE II

A stirred reactor was charged with 112 g. of 1-octene, 66 g. of methylene diacetate, 10 ml. of stannic chloride and 150 ml. of carbon tetrachloride. The reaction mixture was refluxed under nitrogen for 24 hours. Distillation of the product gave a fraction weighing 36.7 g., boiling point 80–112° C., which contained 80 percent 3-nonenyl acetate. Another fraction weighing 16.3 g., boiling point 112–142° C., was found to have 25 percent 3-nonenyl acetate.

This run also demonstrates that substantial amounts of the desired alkanoates are produced by the process of this invention.

Although this invention has been described in considerable detail, it must be understood that such detail is for the purpose of illustration only and that many variations and modifications can be made by one skilled in the art without departing from the scope and spirit thereof.

I claim:
1. A process for the production of an alkenyl alkanoate represented by the formula

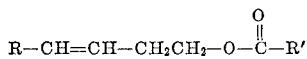

comprising reacting a 1-alkene represented by the formula

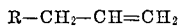

and a methylene dialkanoate represented by the formula

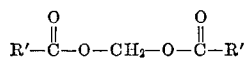

in the presence of a Lewis acid catalyst at a temperature ranging from 0 to 150° C. under sufficient pressure to maintain the reactants substantially in liquid phase, wherein R is hydrogen or alkyl, cycloalkyl, alkylcycloalkyl, cycloalkylalkyl, or combinations thereof having from 1 to 10 carbon atoms per R group and wherein R' is alkyl having from 1 to 6 carbon atoms per R' group.

2. A process according to claim 1 wherein the mole ratio of 1-alkene to methylene dialkanoate ranges from 0.1:1 to 10:1 and the amount of Lewis acid catalyst ranges from 0.1 to 50 g. per 100 g. of reactants.

3. A process according to claim 1 wherein the reaction is carried out for a time ranging from 10 minutes to 48 hours.

4. A process according to claim 1 wherein said methylene alkanoate is methylene diacetate.

5. A process according to claim 1 wherein said 1-alkene is 1-hexene or 1-octene.

6. A process according to claim 1 wherein said Lewis acid catalyst is zinc dichloride, aluminum trichloride, stannic chloride, stannous chloride, arsenic trichloride, ferric chloride, boron trifluoride, titanium tetrachloride, titanium tetrafluoride, bismuth trichloride, antimony trichloride, antimony pentachloride, boron phosphate, stannous fluoride, or boron fluoride etherate.

7. A process according to claim 1 wherein said Lewis acid catalyst is boron fluoride etherate or stannic fluoride.

8. A process according to claim 1 wherein said alkenyl alkanoate is 3-heptenyl aceate or 3-nonenyl acetate.

9. A process according to claim 1 wherein the reaction is carried out in the presence of a substantially completely non-reactive diluent.

10. A process according to claim 9 wherein said diluent is carbon tetrachloride.

References Cited
UNITED STATES PATENTS 3,210,408  10/1965  Bauer et al. _____ 260—491

LORRAINE A. WEINBERGER, Primary Examiner

V. GARNER, Assistant Examiner

U.S. Cl. X.R.
260—79